(12) United States Patent
Souza et al.

(10) Patent No.: US 9,803,791 B2
(45) Date of Patent: *Oct. 31, 2017

(54) METHOD AND APPARATUS FOR REPAIR OF POLYOLEFIN PIPES AND STRUCTURES

(71) Applicant: Milliken Infrastructure Solutions, LLC, Spartanburg, SC (US)

(72) Inventors: James M. Souza, Houston, TX (US); Lawrence Cercone, Littleton, CO (US)

(73) Assignee: Milliken Infrastructure Solutions, LLC, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/078,046

(22) Filed: Mar. 23, 2016

(65) Prior Publication Data
US 2016/0281902 A1    Sep. 29, 2016

Related U.S. Application Data

(63) Continuation of application No. 14/668,096, filed on Mar. 25, 2015, now Pat. No. 9,316,339.

(51) Int. Cl.
*F16L 55/16*    (2006.01)
*F16L 55/168*    (2006.01)
(Continued)

(52) U.S. Cl.
CPC .......... *F16L 55/1683* (2013.01); *B29C 65/02* (2013.01); *B29C 65/665* (2013.01);
(Continued)

(58) Field of Classification Search
CPC .... F16L 55/1683; F16L 55/17; B29C 65/665; B29C 66/5221
(Continued)

(56) References Cited

U.S. PATENT DOCUMENTS

2011/0203694 A1    8/2011  Brooks ........................ 138/99

FOREIGN PATENT DOCUMENTS

JP    H11 336958    12/1999
JP    2012 251628    12/2012
(Continued)

OTHER PUBLICATIONS

Patent Cooperation Treaty PCT International Search Report, dated Jun. 3, 2016. International Application No. PCT/US2016/023584. International Filing Date: Mar. 22, 2016.
(Continued)

*Primary Examiner* — Patrick F Brinson
(74) *Attorney, Agent, or Firm* — Cheryl J. Brickey

(57) ABSTRACT

A method of repairing a polyolefin structure at a damaged area thereof containing applying a filler material as necessary to fill the damaged area, overlaying the filled damaged area with a transitional film having a first side adapted to bond to polyolefins, bonding the transitional film to the polyolefin structure, and applying a reinforcement system over the transitional film. The bonding of the transitional film to the polyolefin structure comprises applying heat to the transitional film.

A repair system for repairing a polyolefin structure containing optionally a filler material on the polyolefin structure, a transitional film applied over and bonded to the polyolefin structure having a first side adapted to bond to polyolefins, and a reinforcement system, applied over the transitional film. The reinforcement system contains a fiber-reinforced polyurethane system bonded to the second side of the transitional film.

15 Claims, 8 Drawing Sheets

(51) Int. Cl.

| | |
|---|---|
| *B29C 73/10* | (2006.01) |
| *B32B 27/32* | (2006.01) |
| *B32B 1/08* | (2006.01) |
| *B29C 73/02* | (2006.01) |
| *B29C 65/66* | (2006.01) |
| *B29C 65/00* | (2006.01) |
| *F16L 55/17* | (2006.01) |
| *B29C 65/02* | (2006.01) |
| B29L 23/00 | (2006.01) |
| B29K 23/00 | (2006.01) |
| B29K 75/00 | (2006.01) |
| B29K 105/08 | (2006.01) |
| B29K 63/00 | (2006.01) |
| F16L 47/02 | (2006.01) |
| F16L 47/20 | (2006.01) |

(52) U.S. Cl.
  CPC .......... *B29C 66/5221* (2013.01); *B29C 73/02* (2013.01); *B29C 73/10* (2013.01); *B32B 1/08* (2013.01); *B32B 27/32* (2013.01); *F16L 55/17* (2013.01); *B29K 2023/00* (2013.01); *B29K 2063/00* (2013.01); *B29K 2075/00* (2013.01); *B29K 2105/08* (2013.01); *B29L 2023/22* (2013.01); *F16L 47/02* (2013.01); *F16L 47/20* (2013.01); *F16L 55/168* (2013.01)

(58) Field of Classification Search
  USPC .................................................... 138/99, 97
  See application file for complete search history.

(56) References Cited

FOREIGN PATENT DOCUMENTS

| | | |
|---|---|---|
| WO | WO 2009/100450 | 8/2009 |
| WO | WO 2009 157748 | 12/2009 |

OTHER PUBLICATIONS

Patent Cooperation Treaty PCT International Search Report, dated Apr. 18, 2017. International Application No. PCT/US2017/014159. International Filing Date: Jan. 19, 2017.

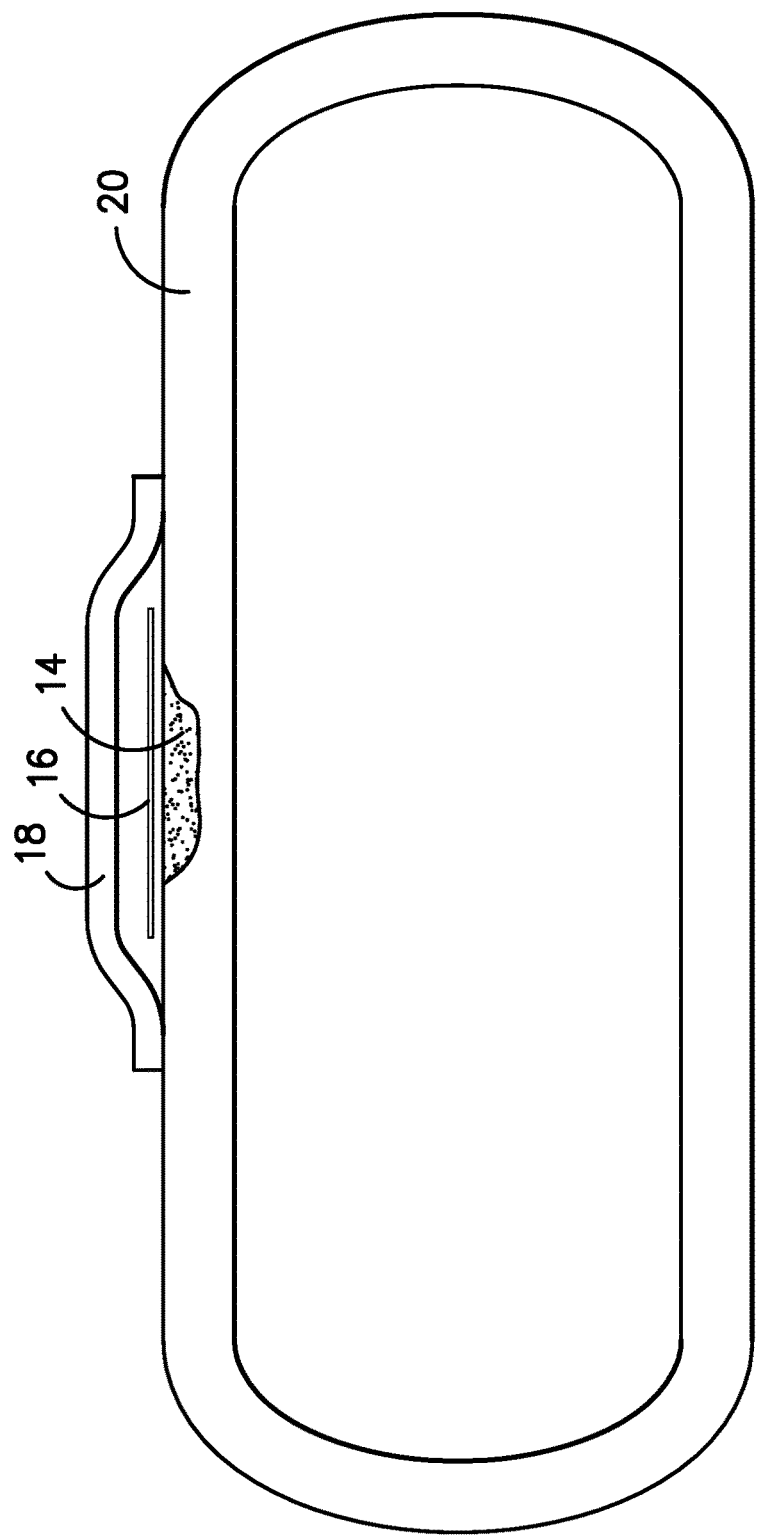
FIG. -12-

METHOD AND APPARATUS FOR REPAIR OF POLYOLEFIN PIPES AND STRUCTURES

RELATED APPLICATIONS

This application is a Continuation of co-pending U.S. application Ser. No. 14/668,096, entitled, "Method and Apparatus for Repair of Polyolefin Pipes and Structures" filed on Mar. 25, 2015, which is herein incorporated by reference in its entirety.

FIELD OF THE INVENTION

The present invention relates generally to polyolefin pipes and other structures, and more particularly relates to a method and apparatus for repairing and/or joining polyolefin pipes and other structures.

BACKGROUND OF THE INVENTION

Polyolefin materials include the following: thermoplastic polyolefins: polyethylene (PE), polypropylene (PP), polymethylpentene (PMP), polybutene-1 (PB-1); Polyolefin elastomers (POE): polyisobutylene (PIB), ethylene propylene rubber (EPR), ethylene propylene diene monomer (M-class) rubber (EPDM rubber). Such materials, especially in a tubular configuration (i.e., pipes), are utilized to deliver or convey an assortment of media that may have corrosive chemical properties. PE and PP pipe is commonly used by gas utility companies, for example. Such pipes themselves may be deployed in environments that also subject the exterior of the pipe to corrosive or otherwise physically or chemically damaging conditions. Polyolefins are also materials from which various other types of structures, such as holding tanks, pressure vessels and the like, which may be deployed in harsh environments.

When deploying polyolefin pipe in a particular application, it is of course frequently necessary to join two sections of pipe together end-to-end. One method of accomplishing this is by welding the pipe sections together. In a common technique known as butt fusion, the two pipe sections are heated by a welding plate in the form of a heated disk to cause the ends of the pipes to become molten. The welding plate is then removed and the pipe sections are pressed together with some predetermined force for some predetermined duration of time, depending upon wall thickness and pipe diameter. The result is a weld joint that typically has a circumferential bead cap. There are known potential problems with such weld joints, due to stress differentials and the like that may exist in the heat-affected zone. Weld joints are susceptible to cracking over time, either due to external forces, such as soil movement or physical impact, or due to the material becoming brittle over time.

There are also various types of field connections that may be made to polyolefin pipe. These include couplings such as tees, elbows, reducers, and so on. Field connections typically employ some form of crimping force to squeeze the joints together. This crimping process is known to introduce micro-cracks in the pipe material. These micro-cracks can grow over time, due to cyclic pressures, exposure to temperature swings, material embrittlement, and so on, leading to failure or leaks.

Persons of ordinary skill in the art will appreciate that polyolefins are materials that by their very nature are difficult to bond to, due to their molecular density and low surface energy. This prevents most simple methods of bonding most types of materials to a polyolefin surface from being entirely effective. Consequently, there has heretofore been little that could be done to repair polyolefin structures that have become degraded by mechanisms such as described above. Pipes may exhibit mechanical damage, including the growth of micro-cracks that can be induced from crimp connections. Of course, this is undesirable where such defects could allow for leaking, posing dangers to individuals or the environment.

SUMMARY OF THE INVENTION

In view of the foregoing and other considerations, the present invention is directed to a method and apparatus for repairing polyolefin structures, particularly (but not exclusively) PE or PP pipe. In one embodiment of the invention, a damaged area of a polyolefin pipe has filler material applied thereto as necessary to fill cracks, voids, or other degradation of the pipe. Following application of a filler material, a transitional film is applied over the area being repaired. The transitional film has a first side that is adapted to bond to polyolefins. The bonding process may involve application of heat and/or compressive force. After the transitional film is applied and bonded, a reinforcement system, such as a fiber-reinforced polyurethane application, is applied over the repair area to complete the repair process.

In another embodiment of the invention, a butt weld joint is repaired or reinforced. In some cases, it may be necessary to prepare the joint by smoothing or eliminating the bead cap formed during the welding process. In this embodiment, no filler material may be necessary. The transitional film as described above is applied over the joint and bonded to the joined segments of pipe. Thereafter, a reinforcement system is applied over the transitional film to complete the repair or preventative reinforcement of the weld joint.

In another embodiment of the invention, a crimped area, such as at a field connection, is repaired or reinforced, in a manner similar to that described above for repairing or reinforcing a butt weld.

BRIEF DESCRIPTION OF THE DRAWINGS

The present invention is best understood with reference to the following detailed description of embodiments of the invention when read in conjunction with the attached drawings, in which like numerals refer to like elements, and in which:

FIG. 12 is a side, longitudinal, cross-sectional view of a holding tank with a reinforcement system applied over the transitional film.

DETAILED DESCRIPTION OF PREFERRED EMBODIMENTS OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering practices for the environment in question. It will be appreciated that such development efforts might be complex and time-consuming, outside the knowledge base of typical laymen, but would nevertheless be a routine undertaking for those of ordinary skill in the relevant fields.

Figure 1:
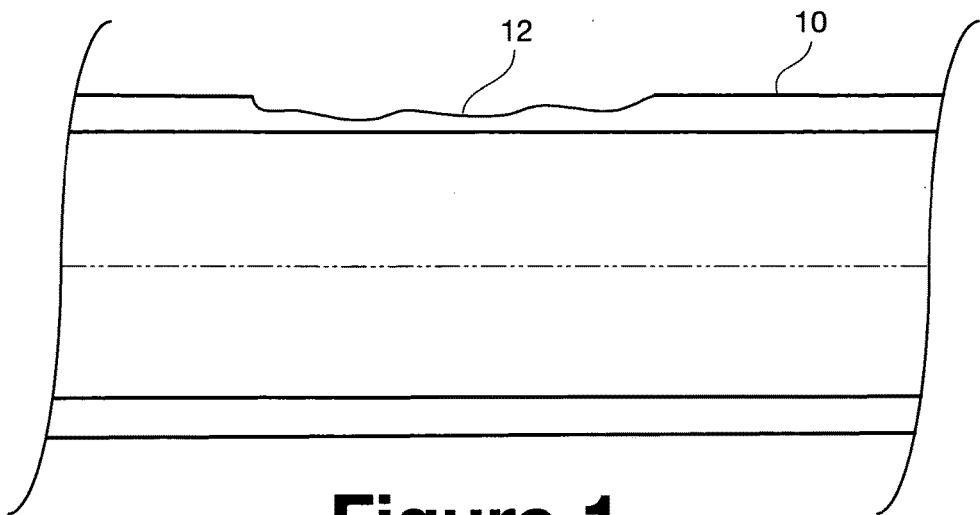
FIG. 1 is a side, longitudinal cross-sectional view of a length of pipe to be repaired in accordance with one embodiment of the invention.

Referring to FIG. 1, there is shown a longitudinal, cross-sectional view of a section of polyolefin pipe (e.g., PE or PP pipe) identified with reference numeral 10. As shown in FIG. 1, pipe 10 has a damaged area 12 at which pipe 10 has been degraded. Although the embodiment of FIG. 1 comprises a pipe, those of ordinary skill in the art having the benefit of the present disclosure will appreciate that the invention may be practiced in connection with other types of PE structures.

Figure 2:
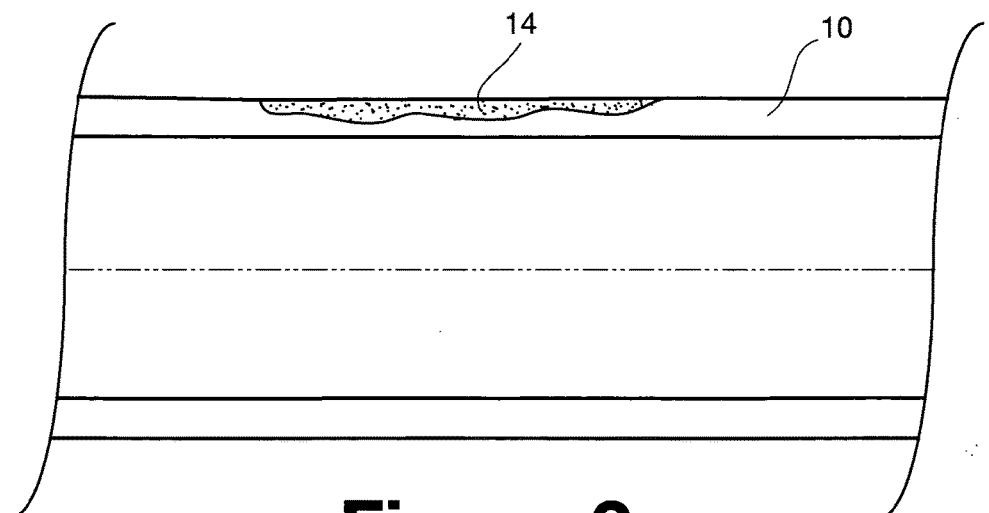
FIG. 2 is a side, longitudinal cross-sectional view of the pipe from FIG. 1 having a filler material applied in a damaged area thereof.

FIG. 2 illustrates a first step in a repair method in accordance with an exemplary embodiment of the invention, wherein a filler material 14 is applied over the damaged area 12 as necessary to fill the damaged area 12. In one embodiment, the filler material 14 may be a polyester, epoxy, vinyl ester, polyurethane, thermoplastic material, rubber compound, or acrylic, such as a methylacrylate or thermoplastic material.

Figure 3:
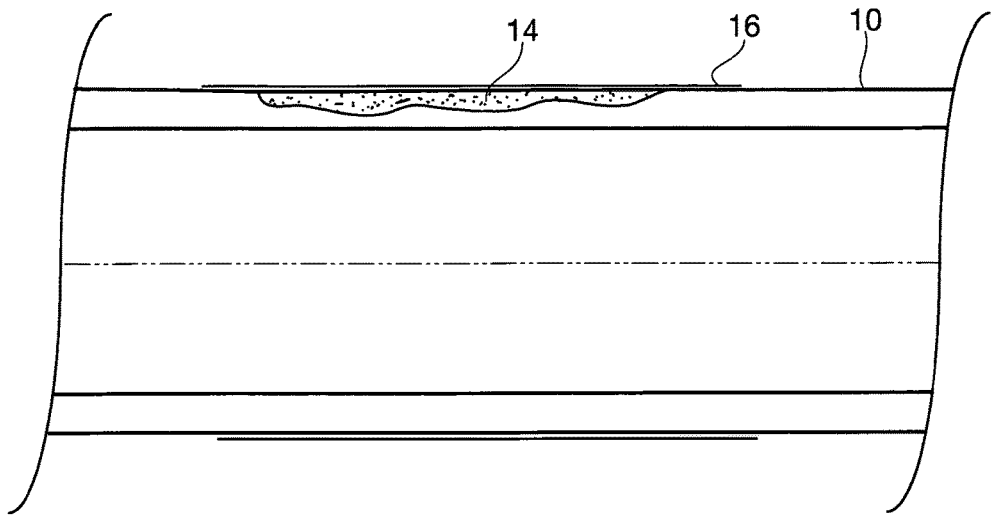
FIG. 3 is a side, longitudinal cross-sectional view of the pipe from FIG. 2 having a transitional film applied thereover.

Once the filler material has been applied and cured or otherwise hardened, a next step in accordance with the disclosed embodiment of the invention is to overlay a transitional film 16 over the section of pipe being repaired. This is shown in FIG. 3. In a presently preferred embodiment of the invention, the transitional film 16 comprises Nolax S22.2202, a co-extruded multi-layer adhesive film commercially available from Nolax AG, a member of the Colla no Group headquartered in Sempach Station, Switzerland. See www.nolax.com.

A preferred attribute of the transitional film 16 is that it is adapted on one side thereof to bond effectively with polyolefinic materials, such as PE, EVA, EPOM, and PP and adapted on the opposite side thereof to bond to PVC, polyurethane, ABS, PC, PA, etc.

In an exemplary embodiment, the transitional film is wrapped around the length of pipe 10 being repaired. Those of ordinary skill in the art will recognize that the bonding of film 16 to pipe 10 must be activated. Typically, this is accomplished by means of application of heat and compressive force. One method of accomplishing this is through the use of heat-activated shrink tape (not shown in the Figures), such as 220R 4" 20% shrink release coated roll commercially available from Dunston Inc., headquartered in Charlotte, N.C., United States. See www.shrinktape.com.

Figure 4:
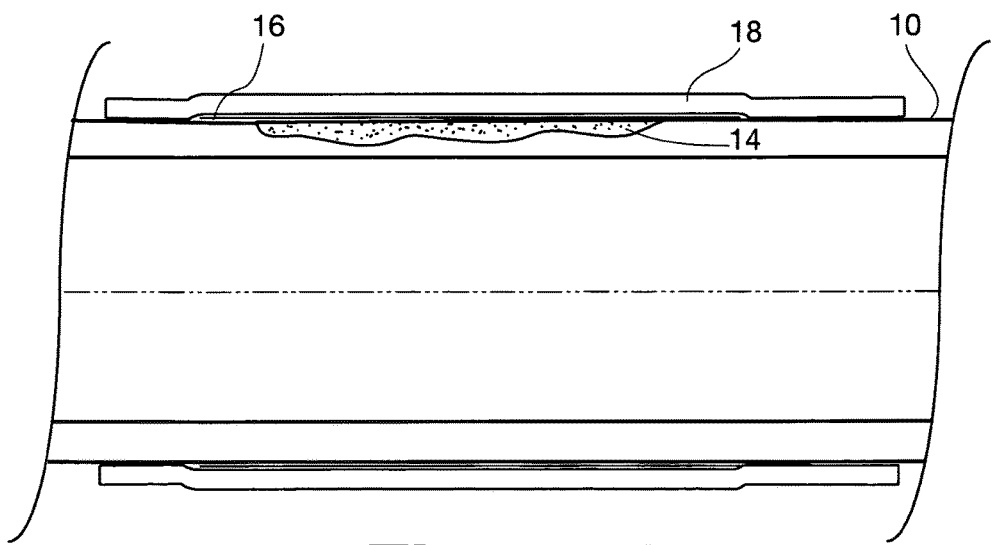
FIG. 4 is a side, longitudinal, cross-sectional view of the pipe from FIG. 3 having a reinforcement system applied over the repair area including the transitional film.

Once film 16 has been bonded to pipe 10 over the area being repaired, an outer reinforcement system 18 is applied over the repair area, as shown in FIG. 4. Note that the heat shrink tape or other means for activating the bond of the film 14 to pipe 10 is preferably removed prior to application of the outer reinforcement system 18 and hence is not shown in FIG. 4. In one preferred embodiment of the invention, the outer reinforcement system 18 comprises A+ Wrap™, a high-strength wrap comprised of a fiberglass reinforced substrate factory impregnated with moisture-cured polyurethane. A+ Wrap™ is commercially available from Pipe Wrap, Inc., Houston, Tex. See http:Uwww.piperepair.net/products/structural-repair/a-wrap/, hereby incorporated by reference herein in its entirety. In another embodiment, the outer reinforcement system 18 comprises a fiber-reinforced epoxy system, such as FormaShield™, which is also commercially available from Pipe Wrap, Inc. See http://www.piperepair.net/products/structural/repair/formashield/, hereby incorporated by reference herein in its entirety.

In addition to providing a means of effectuating structural repair of polyolefin structures such as PE pipes, as described above with reference to FIGS. 1-4, it is contemplated that the present invention may be employed to create a joint between two sections of pipe, circumventing the need for a conventional butt fusion operation. This is shown in FIGS. 5-7.

Figure 5:
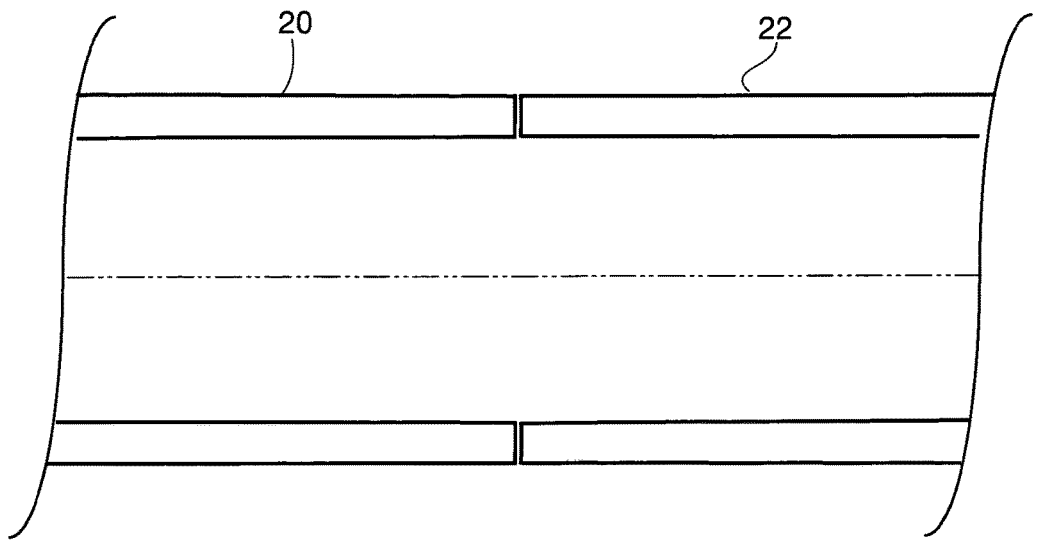
FIG. 5 is a side, longitudinal, cross-sectional view of two sections of pipe aligned end-to-end in preparation for a joining operation in accordance with one embodiment of the invention.

In particular, in FIG. 5, there is shown a longitudinal, cross-sectional view of two sections of pipe designated with reference numerals 20 and 22. Pipe sections 20 and 22 are oriented end-to-end in preparation of the creation of a joint therebetween.

Figure 6:
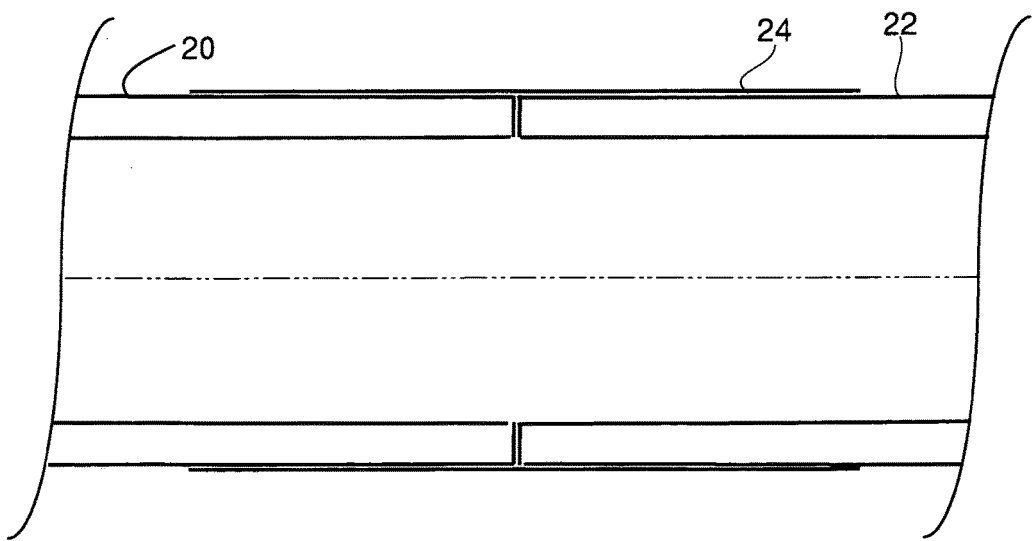
FIG. 6 is a side, longitudinal, cross-sectional view of the two sections of pipe from FIG. 5 with a transitional film applied over the joint area.

FIG. 6 shows the respective pipe sections 20 and 22 from FIG. 5 with a transitional film layer 24 bonded over the joint area. As in the previously described embodiment, transitional film layer 24 is adapted on one side to bond to polyolefins, and the bond may be activated by applying heat and compressive force.

Figure 7:
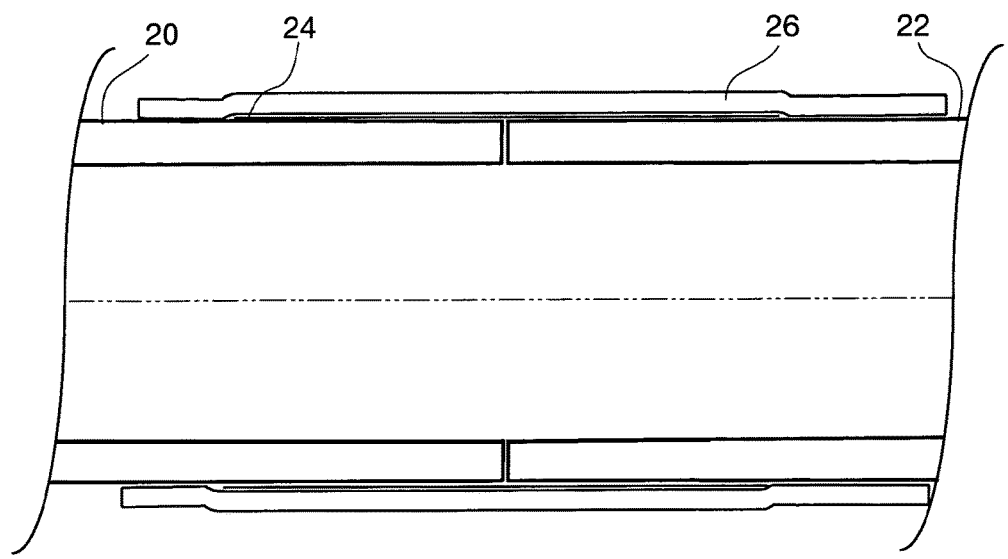
FIG. 7 is a side, longitudinal, cross-sectional view of the two sections of pipe from FIG. 5 with a reinforcement system applied over the transitional film.

FIG. 7 shows the respective pipe sections 20 and 22 with a reinforcement system 26 applied over and bonded pipes 20 and 22 in the area of transitional film 24. The aforementioned A+ Wrap™ or Formashield™ products are contemplated to be suitable reinforcement systems 26 for the purposes of the present invention.

Figure 8:
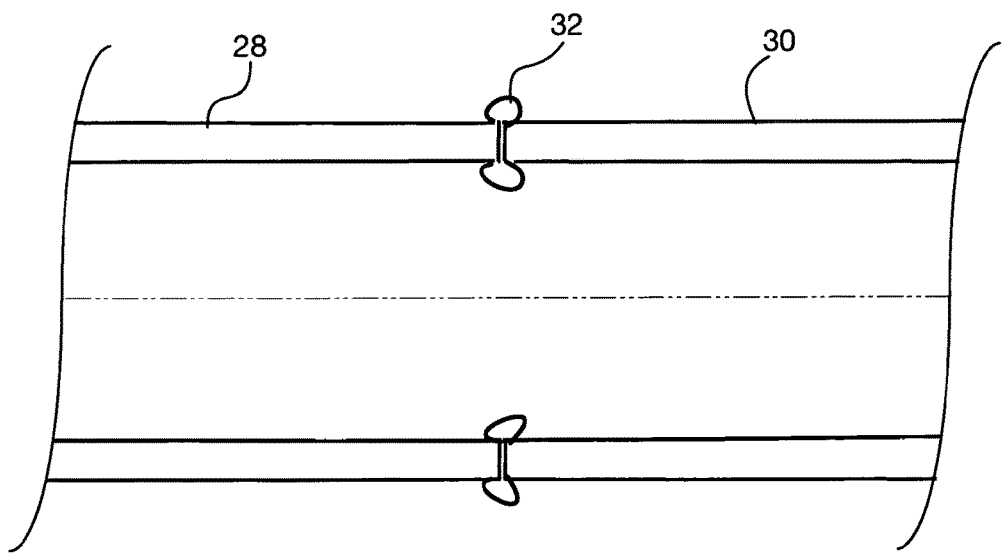
FIG. 8 is a side, longitudinal, cross-sectional view of two sections of pipe having been welded together using a conventional butt fusion technique.

It is further contemplated that the present invention may be employed as a preventative measure to strengthen the integrity of a conventional butt fusion joint between two sections of pipe. FIG. 8 shows two sections of polyolefin pipe 28 and 30 having been welded together using a conventional butt fusion technique. As previously noted such a technique commonly results in the formation of a bead cap 32 around the circumference of the weld joint.

Figure 9:
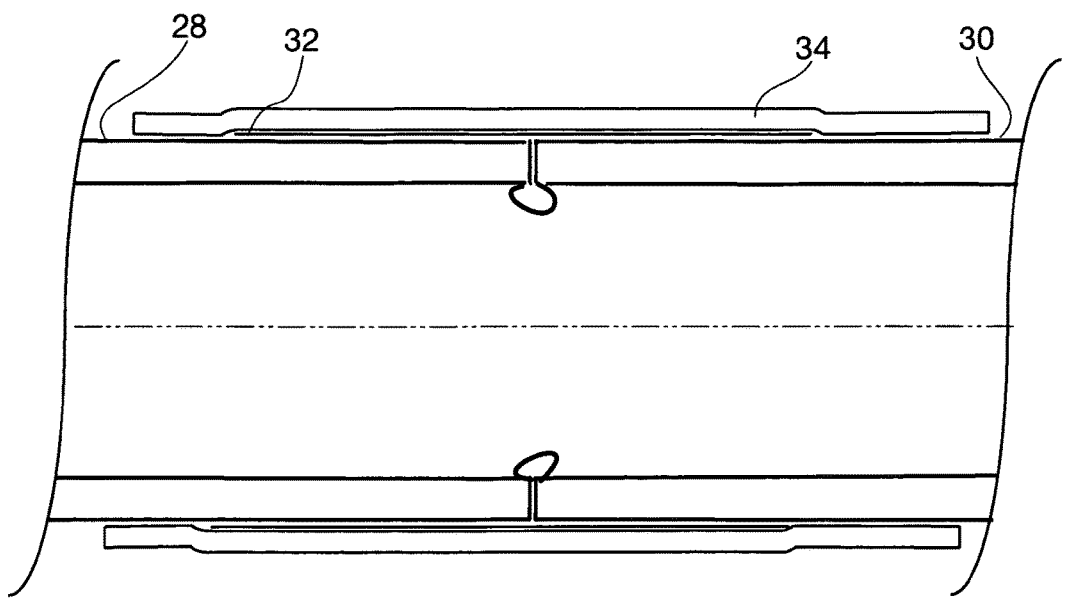
FIG. 9 is a side, longitudinal, cross-sectional view of the two welded sections of pipe from FIG. 8 with the joint reinforced in accordance with one embodiment of the invention.

FIG. 9 shows the sections of pipe 28 and 30 with the weld joint therebetween 5 reinforced in accordance with one embodiment of the invention. From FIG. 9, it is evident that the bead cap 32 is preferably removed prior to application and bonding of a transitional film 32 and a reinforcement system 34.

Figure 10:
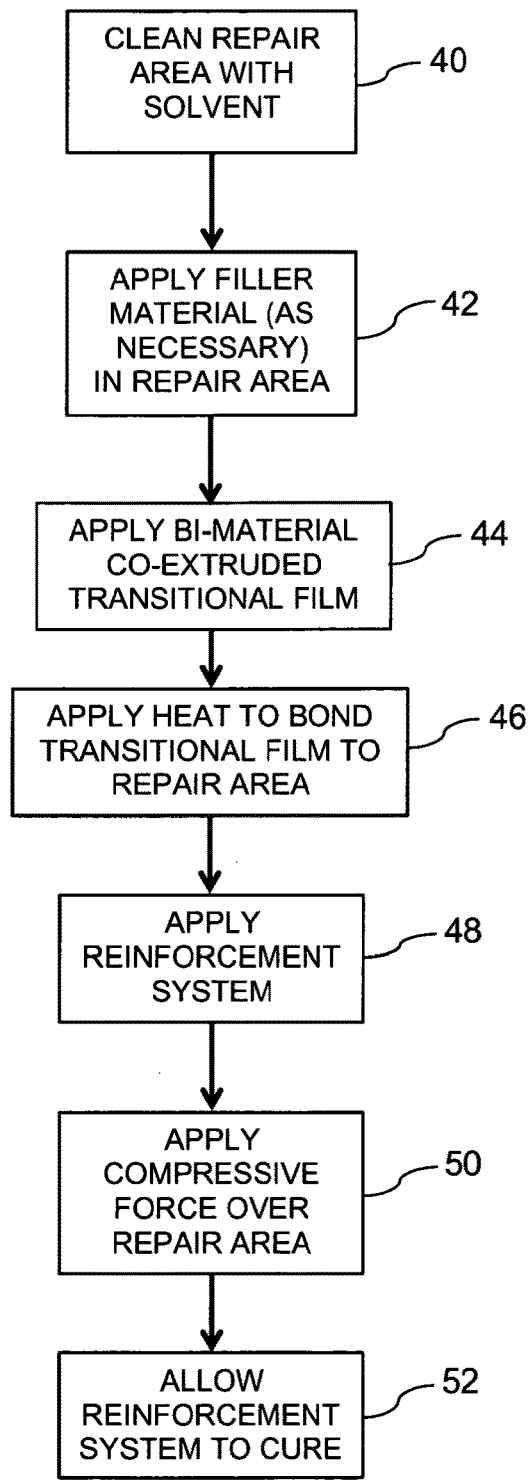
FIG. 10 is a flow diagram illustrating the steps of repairing a tubular member in accordance with one embodiment of the invention.

Turning to FIG. 10, there is shown a flow diagram illustrating a repair methodology in accordance with one embodiment of the invention. In particular, the process depicted in FIG. 10 is believed to be the preferable means of repairing tubular members, such as pipes.

As shown in FIG. 10, the first step 40 is to clean the repair area, for example, with an appropriate solvent, to assure optimal bonding during the repair process.

As described above, the next step 42 is to apply filler material as necessary to provide a relatively smooth repair surface. This step 42 may or may not be necessary depending upon the nature of the damage being repaired. As noted above, suitable filler materials may be a polyester, epoxy, vinyl ester, polyurethane, thermoplastic material, rubber compound, or acrylic, such as a methylacrylate or thermoplastic material.

The next step 44 is to apply the bi-material coextruded transitional film to the repair area. In one embodiment, bonding of the transitional film to the repair area is accomplished by applying heat, such as with a heat gun or the like, as represented by block 46.

Next, in block 48, a reinforcement system is applied over the repair area. The aforementioned A+ Wrap™ or FormaShield™ systems are candidates for the reinforcement system.

Next, in block 50, compressive force is applied to the repair area. As noted above, one manner of accomplishing this is through the use of heat-shrinking tape that is wrapped around the tubular member being repaired and then applying heat, such as with a heat gun, to cause the tape wrap to constrict or compress around the tubular member and the repair area.

As noted in block 52, the reinforcement system is allowed to cure, at which time the means of applying compressive force (e.g., the heat-shrink tape) may be removed.

Figure 11:
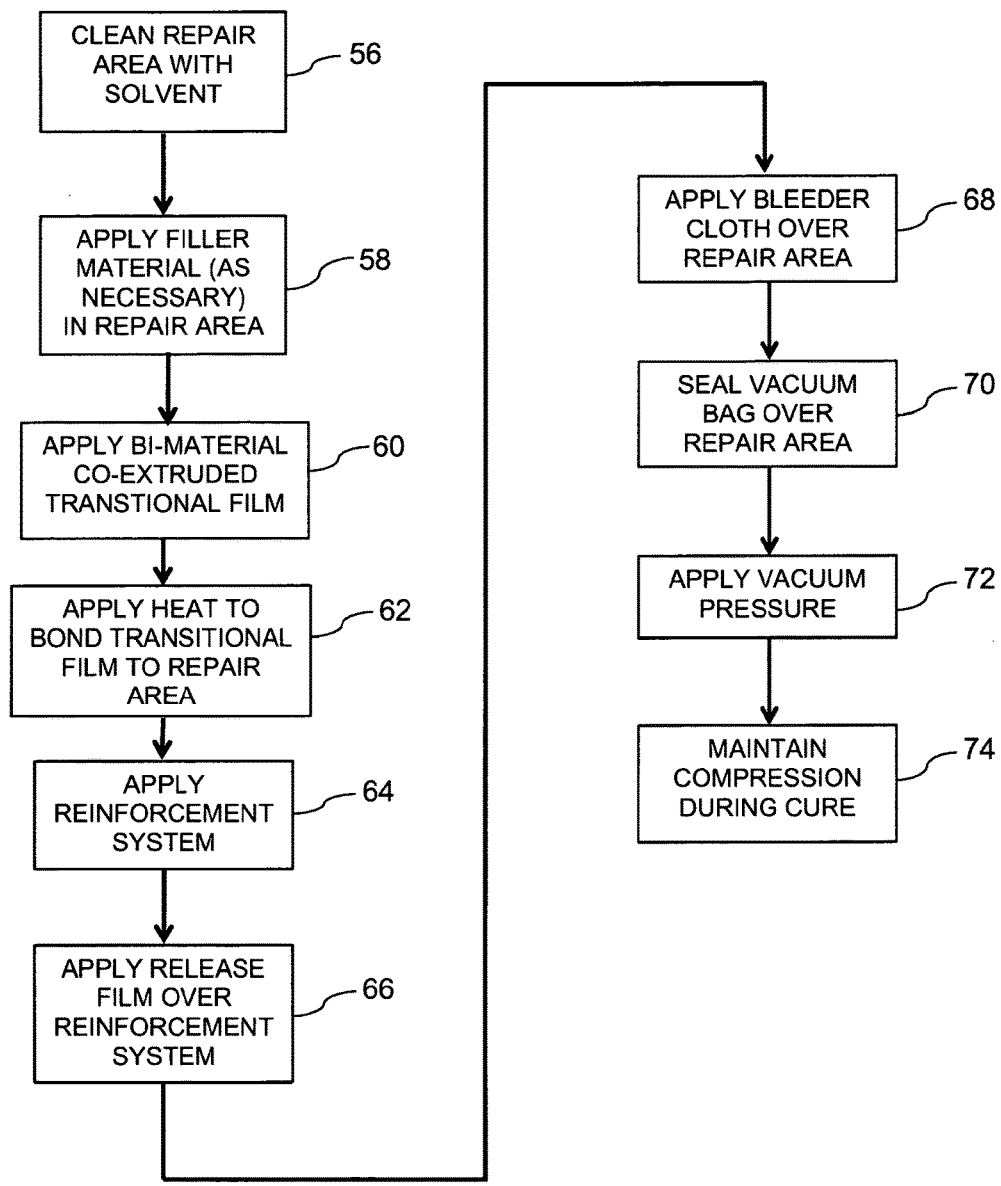
FIG. 11 is a flow diagram illustrating the steps of repairing a non-tubular member in accordance with another embodiment of the invention.

Turning now to FIG. 11, there is shown an embodiment of the invention which may be advantageously employed for the repair of non-tubular polyolefin members. The process begins with block 56, wherein the repair surface is prepared by cleaning, with appropriate solvent(s). As in the previous embodiments, a filler material may or may not be applied, as represented by block 58 in FIG. 11.

In block 60, the bi-material, co-extruded transitional film is applied, as hereinbefore described. Heat is the preferred method of bonding the transitional film to the repair area, as reflected by block 52. Thereafter, a reinforcement system as described above is applied.

In the embodiment of FIG. 11, a next step, in block 66, is to apply a release film over the reinforcement system. In a preferred embodiment, the release film is a silicone-treated PE sheet that is perforated. Following application of the release film, a bleeder cloth material is applied over the repair area, as represented by block 68. In one embodiment, the bleeder cloth material is a non-woven polyester material adapted to absorb excess resin out of the reinforcement system during the cure process.

A vacuum bag pressure system is employed to exert compression force on the repair area as the reinforcement system is curing. In block 70 of FIG. 11, a vacuum bag is sealed around the repair area. In one embodiment, a zinc-oxide based double-sided tape is used to create the seal of the vacuum bag, which may be a high-density PE film, for example.

In block 72, vacuum pressure is applied to compress the vacuum bag against the repair area. This compression force is maintained for as long as it takes for the reinforcement system to cure, typically two to four hours.

From the foregoing detailed description, it will be apparent to those of ordinary skill in the art that a method and apparatus (system) for repair polyolefin structures such as PE or PP pipes as well as non-tubular structures, such as holding tanks and the like, has been disclosed. FIG. 12 illustrates a side, longitudinal, cross-sectional view of a holding tank 200 with a reinforcement system 18 applied over the transitional film 16 which is over filler material 14 which fills a damaged area. Although specific implementation details have been provided herein, this has been done solely for the purposes of illustrating generally the scope of the invention, which is defined in the claims which follow. It is to be understood that various substitutions, alterations, and/or modifications may be made to the disclosed embodiment without departing from the actual scope of the invention.

The invention claimed is:

1. A method of repairing a polyolefin structure at a damaged area thereof, comprising:
    (a) applying a filler material as necessary to fill the damaged area;
    (b) overlaying the filled damaged area with a transitional film having a first side adapted to bond to polyolefins;
    (c) bonding the transitional film to the polyolefin structure, wherein the bonding of the transitional film to the polyolefin structure comprises applying heat to the transitional film;
    (d) applying a reinforcement system over the transitional film.

2. The method of claim 1, wherein the polyolefin structure is a non-tubular structure.

3. A method in accordance with claim 1, wherein the step (d) of applying a reinforcement system over the transitional film comprises applying a fiber-reinforced epoxy system which bonds to a second side of the transitional film.

4. A method of repairing a polyolefin structure at a damaged area thereof, comprising:
    (a) applying a filler material as necessary to fill the damaged area;
    (b) overlaying the filled damaged area with a transitional film having a first side adapted to bond to polyolefins;
    (c) bonding the transitional film to the polyolefin structure;
    (d) applying a reinforcement system over the transitional film, wherein applying a reinforcement system over the transitional film comprises applying a fiber-reinforced epoxy system which bonds to a second side of the transitional film.

5. The method of claim 4, wherein step (d) further comprises wrapping the polyolefin structure with heat-activated shrink tape and heating the damaged area to activate a bonding process of the transitional film to the polyolefin structure.

6. The method of claim 4, wherein the polyolefin structure is a non-tubular structure.

7. The method of claim 4, wherein the polyolefin structure is a holding tank.

8. A method of repairing a polyolefin structure at a damaged area thereof, comprising:
    (a) applying a filler material as necessary to fill the damaged area;
    (b) overlaying the filled damaged area with a transitional film having a first side adapted to bond to polyolefins;

(c) bonding the transitional film to the polyolefin structure;

(d) applying a reinforcement system over the transitional film, wherein applying a reinforcement system over the transitional film comprises applying a fiber-reinforced polyurethane system which bonds to a second side of the transitional film.

9. The method of claim 8, wherein step (d) further comprises wrapping the polyolefin structure with heat-activated shrink tape and heating the damaged area to activate a bonding process of the transitional film to the polyolefin structure.

10. The method of claim 8, wherein the polyolefin structure is a non-tubular structure.

11. The method of claim 8, wherein the polyolefin structure is a holding tank.

12. A repair system for repairing a polyolefin structure, comprising:

optionally a filler material on the polyolefin structure;

a transitional film applied over and bonded to the polyolefin structure, the transitional film having a first side and a second side, the first side adapted to bond to polyolefins, wherein the transitional film comprises a bi-material co-extruded film; and a reinforcement system, applied over the transitional film, wherein the reinforcement system comprises a fiber-reinforced polyurethane system bonded to the second side of the transitional film.

13. A repair system for repairing a polyolefin structure, comprising:

optionally a filler material on the polyolefin structure;

a transitional film applied over and bonded to the pipe, the transitional film having a first side and a second side, the first side adapted to bond to polyolefins, wherein the transitional film comprises a bi-material co-extruded film; and a reinforcement system, applied over the transitional film, wherein the reinforcement system comprises a fiber-reinforced epoxy system bonded to the second side of the transitional film.

14. The method of claim 1, wherein the polyolefin structure is a holding tank.

15. A method in accordance with claim 1, wherein the step (d) of applying a reinforcement system over the transitional film comprises applying a fiber-reinforced polyurethane system which bonds to a second side of the transitional film.

* * * * *